United States Patent [19]

Nagai et al.

[11] Patent Number: 5,436,547
[45] Date of Patent: Jul. 25, 1995

[54] INVERTER AND AIR CONDITIONER CONTROLLED BY NORMAL AND DEFROST ENERGIZATION PATTERNS

[75] Inventors: Kazunobu Nagai, Aichi; Ichiro Hongo; Nobuo Matsui, both of Yokohama, all of Japan

[73] Assignee: Kabushiki Kaisha Toshiba, Kanagawa, Japan

[21] Appl. No.: 169,995

[22] Filed: Dec. 17, 1993

[30] Foreign Application Priority Data

Dec. 18, 1992 [JP] Japan .................. 4-338539

[51] Int. Cl.[6] ............................. H02P 5/418
[52] U.S. Cl. ............................. 318/801; 318/811; 62/151; 62/228.4
[58] Field of Search ................ 318/798-815, 318/599, 606; 62/151-156, 211, 223, 228.1, 228.2, 228.3, 228.4, 234; 363/50, 55, 56, 41; 364/557, 563

[56] References Cited

U.S. PATENT DOCUMENTS

| | | | |
|---|---|---|---|
| 4,467,613 | 8/1984 | Behr et al. | 62/115 |
| 4,698,774 | 10/1987 | Itani et al. | 318/802 X |
| 5,144,812 | 9/1992 | Mills, Jr. et al. | 62/186 |
| 5,189,886 | 3/1993 | Terauchi | 62/228.5 |
| 5,271,238 | 12/1993 | Powell et al. | 62/228.4 |
| 5,275,012 | 1/1994 | Dage et al. | 62/228.1 |
| 5,319,943 | 6/1994 | Bahel et al. | 62/156 |

Primary Examiner—Jonathan Wysocki
Attorney, Agent, or Firm—Limbach & Limbach

[57] ABSTRACT

An inverter controlling an air conditioner including a brushless motor serving as a compressor motor. A microcomputer detects the rotational position of a rotor of the brushless motor from signals obtained by comparison of each of terminal voltages of the motor windings with a reference voltage in order to determine a commutation time. In a normal operation, the microcomputer forms, according to a normal energization signal forming pattern, energization signals corresponding to every commutation time at every occurrence of the commutation time, so that the motor windings are sequentially energized. When frost forms on an outdoor heat exchanger of a heat pump during a warming operation and a defrosting operation is necessary, the energization signals are formed according to a loss increasing energization signal forming pattern so that loss increasing energization signals for causing the rotor to produce counter torque are added to the respective energization signals formed according to the normal pattern. As a result, the brushless motor loss is increased and the brushless motor generates heat. The generated heat is used for defrosting the outdoor heat exchanger.

13 Claims, 11 Drawing Sheets

5,436,547

INVERTER AND AIR CONDITIONER CONTROLLED BY NORMAL AND DEFROST ENERGIZATION PATTERNS

BACKGROUND OF THE INVENTION

1. Field of the invention

This invention relates to an inverter including a switching circuit for sequentially energizing a plurality of windings of a brushless motor driving a compressor of a heat pump, at a commutation time corresponding to a predetermined rotational position of a rotor of the motor and further relates to an air conditioner controlled by such an inverter as mentioned above.

2. Description of the Prior Art

A heat pump has recently been incorporated in air conditioners. In such heat pump type air conditioners, an outdoor heat exchanger composing an outdoor equipment serves as a condenser in a cooling operation and as an evaporator in a warming operation. When an outdoor temperature drops during the warming operation particularly in winter, frost forms on the outdoor equipment of the air conditioner, which lowers its warming performance.

In view of the above-described drawback, a defrosting operation for removing the frost on the outdoor heat exchanger is executed during the warming operation. Two manners of defrosting the outdoor heat exchanger are known in the art. In one manner, the heat pump is switched to a cooling cycle by a four way valve so that the outdoor heat exchanger serves as the condenser. In the other manner, the four way valve is maintained in the warming cycle and a bypass is opened for directly supplying, to the outdoor heat exchanger, refrigerant discharged from a compressor usually comprising a casing hermetically enclosing a compressing section and an electric motor driving the compressing section. In each of the above-mentioned defrosting manners, the high temperature refrigerant discharged from the compressor is directly supplied to the outdoor heat exchanger to raise its temperature such that it is defrosted.

Generally, the necessity of the defrosting operation or detection of the frost on the outdoor heat exchanger is based on the fact that the temperature of the outdoor heat exchanger has been decreased to a predetermined value or below. Other detecting manners are also known in the art. For example, the detection of the frost is based on temperature changes of the indoor heat exchanger, changes in the difference between the temperature of the indoor heat exchanger and the room temperature, changes in the difference between the temperature of the outdoor heat exchanger and the outdoor temperature, or a rate of each of these temperature changes.

The warming performance for the interior of a room is lowered or reduced to zero during the defrosting operation. Accordingly, it is desirable that the defrosting operation be completed in a period of time as short as possible for prevention of drop of the temperature in the room. For the purpose of reduction in the period of the defrosting operation, the prior art has provided utilization of heat generated by an electric motor driving the compressor composing the outdoor equipment of the air conditioner with the outdoor heat exchanger. In this case, the motor is required to generate a large amount of heat while the defrosting operation is being executed, that is, it is required to have a low efficiency or a large loss.

On the other hand, induction motors and brushless motors classified into a DC motor have recently been employed for driving the compressors of the air conditioners for the purpose of variable performance of the compressors or saving electric power consumption. These induction motors and the brushless motors are controlled by an inverter.

FIG. 10 schematically illustrates a prior art electrical circuit arrangement for control of the induction motor by the inverter. A control circuit 1 controls transistors 5 to 10 of a switching circuit 4, thereby controlling a voltage applied to each phase winding of an induction motor 3 from a DC power supply circuit 2 and its frequency. A high efficient operation can generally be achieved by controlling the voltage applied to the induction motor 3 and the frequency so that the relationship as shown in FIG. 11 is obtained.

FIG. 12 schematically illustrates a prior art electrical circuit arrangement for control of the brushless motor by the inverter. A control circuit 11 controls transistors 15 to 20 of a switching circuit 14 on the basis of a position detection signal generated by a position detecting circuit 13 detecting the rotational position of a rotor of the brushless motor 12. Furthermore, information about the motor speed is also obtained from the position detection signal. The speed information is compared with a speed command signal for the purpose of the motor speed control by way of a pulse width modulation system.

In the control of the induction motor by the inverter, the motor loss can be readily increased with the amount of heat generated by the same being increased when the voltage is raised relative to the frequency during the defrosting operation but not in the manner that the relationship of FIG. 11 is obtained. In the brushless motor, however, the motor loss cannot be increased even if the relationship between the frequency and voltage is controlled, and accordingly, high efficient operation is performed even during the defrosting operation. Thus, the brushless motor cannot not generate so much heat as to be used for the defrosting and accordingly, the defrosting operation needs much time. Consequently, the room temperature is decreased during the defrosting, which lowers the comfortability provided by the air conditioner.

The air conditioner also necessitates the heat generated by the compressor or compressor motor in a preparatory defrosting operation or in the case where the temperature of the compressor drops during the normal operation, as well as in the above-described defrosting operation. The preparatory defrosting operation is performed for shortening the period of the defrosting operation. In the preparatory defrosting operation, the compressor is caused to generate heat prior to start of the defrosting operation and the heat residual in the compressor is used for the defrosting operation. The preparatory defrosting operation is performed when it is expected that the defrosting will be necessary or immediately before the defrosting operation. In the prior art preparatory defrosting operation, in the condition that the heat pump is maintained in the warming cycle, an indoor fan supplying the indoor air to the indoor heat exchanger is interrupted, a pressure reducer is throttled, or the speed of the compressor motor is increased over the command value based on the room temperature. The preparatory defrosting operation is completed and the defrosting operation is initiated when the temperature of the compressor has been increased to a predetermined value or above as the result of execution of the preparatory defrosting operation or when the preparatory defrosting operation has been performed for a predetermined period of time.

The indoor fan is interrupted or the pressure reducer is throttled in the preparatory defrosting operation, as described above. Accordingly, the preparatory defrosting operation also needs to be completed in a period of time as short as possible for prevention of drop of the temperature in the room. Furthermore, the compressor is maintained at about 80° C. during the normal operation. The temperature of the compressor is not increased when the compressor motor is turned on and off alternately at short intervals. In this case, the operation of the air conditioner is performed with the compressor temperature low. A lubricating oil in the compressor is caused to merge into the refrigerant when the difference between the compressor temperature and that of the heat exchanger serving as the condenser, which heat exchanger is an indoor heat exchanger in the warming operation and an outdoor heat exchanger in the cooling operation, becomes small. Consequently, the viscosity of the lubricating oil is reduced and accordingly, the lubricity of the lubricating oil is reduced. Thus, since the compressor may be damaged, the compressor temperature needs to be raised in a short period of time in this case, too.

As described above, the compressor temperature needs to be raised in the heat pump type air conditioners when the preparatory defrosting operation is executed and when the compressor temperature has been decreased during the normal operation as well as in the defrosting operation. However, when the brushless motor is provided for driving the compressor of the heat pump type air conditioner, it is difficult to drive the brushless motor so that its loss is increased and accordingly, the heat for heating the compressor cannot be obtained. Consequently, the operational comfortability provided by the air conditioner and its reliability are lowered as compared with that employing the induction motor for driving the compressor.

SUMMARY OF THE INVENTION

Therefore, an object of the present invention is to provide an inverter for controlling the brushless motor driving the compressor of the heat pump, the inverter being capable of reducing the motor efficiency to increase the motor loss, and an air conditioner controlled by the inverter.

In one aspect, the invention provides an inverter comprising a switching circuit including a plurality of switching elements sequentially energizing windings of a plurality of phases of a brushless motor driving a compressor of a heat pump, a pulse width modulation circuit for obtaining a pulse width modulated signal, and position detecting means for detecting a rotational position of a rotor of the brushless motor, thereby generating a position detection signal. Energization signal forming means is provided for determining a commutation time on the basis of the position detection signal generated by the position detecting means and forming an energization signal corresponding to the determined commutation time. The energization signal forming means has a normal energization signal forming pattern and a loss increasing energization signal forming pattern wherein an efficiency of the brushless motor is lower than in the normal energization signal forming pattern. The energization signal forming means switches from the normal energization signal forming pattern to the loss increasing energization signal forming pattern in a predetermined period during drive of the brushless motor. A drive circuit is provided for synthesizing the energization signal and the pulse width modulated signal, thereby obtaining a signal for driving each switching element.

Since the energization signal is formed in accordance with the normal energization signal forming pattern in the normal operation, the brushless motor can be driven with high efficiency. When the energization signal forming means is switched from the normal energization signal forming pattern to the loss increasing energization signal forming pattern in the predetermined period of time, the motor efficiency can be reduced such that the amount of heat generated by the brushless motor can be increased.

In another aspect, the invention provides an inverter comprising a switching circuit including a plurality of switching elements sequentially energizing windings of a plurality of phases of a brushless motor driving a compressor of a heat pump, a pulse width modulation circuit for obtaining a pulse width modulated signal, and position detecting means for detecting a rotational position of a rotor of the brushless motor by comparing a terminal voltage of each winding with a reference voltage, thereby generating a position detection signal. Energization signal forming means is provided for determining a commutation time on the basis of the position detection signal generated by the position detecting means and forming an energization signal corresponding to the determined commutation time. The energization signal forming means has a normal energization signal forming pattern and a loss increasing energization signal forming pattern in which an efficiency of the brushless motor is lower than in the normal energization signal forming pattern. The energization signal forming means switches from the normal energization signal forming pattern to the loss increasing energization signal forming pattern in a predetermined period during drive of the brushless motor. A drive circuit is provided for synthesizing the energization signal and the pulse width modulated signal, thereby obtaining a signal for driving each switching element.

Since the rotational position of the rotor is detected by comparison of the terminal voltage of each winding with the reference voltage, the position sensor comprising one or more Hall elements can be eliminated.

It is preferable that the reference voltage is set at one half of a DC power supply voltage supplied to the switching circuit and that the position detecting means generates the position detection signal when the terminal voltage of each winding and the reference voltage cross. In order that the commutation time is readily determined by a software programmed in a microcomputer, in addition to the above-described arrangement, the energization signal forming means may comprise a first timer measuring a period between a time when the terminal voltage of each winding and the reference voltage cross and a subsequent time when the terminal voltage of each winding and the reference voltage cross, operation means for operating a period between the time when the terminal voltage of each winding and the reference voltage cross and the commutation time, on the basis of the period measured by the first timer, and a second timer measuring the period obtained by the operation means and wherein the commutation time is determined to be a time when the second timer completes the measuring operation.

It is also preferable that the energization signal formed in accordance with the loss increasing energization signal forming pattern is formed by adding a loss increasing signal for causing the rotor of the brushless motor to produce a counter torque, to the energization signal formed in accordance with the normal energization signal forming pattern. In this arrangement, the energization signal forming means may further comprise, in addition to the above-described first and second timers, a third timer starting a timing operation at the time when the terminal voltage of each winding and the reference voltage cross. In this case, the energization signal forming means forms the loss increasing energization signal during the timing operation of the third timer.

The energization signal forming means may change a period of the loss increasing energization signal, thereby controlling the motor loss.

In further another aspect, the invention provides an air conditioner comprising a heat pump including a compressor driven by a brushless motor, an outdoor heat exchanger, a pressure reducer and an indoor heat exchanger connected in turn by a refrigerant passage. The brushless motor is controlled by any one of the above-described inverters.

According to the above-described air conditioner, the brushless motor is supplied with the energization signal formed in accordance with the loss increasing energization signal forming pattern, for example, in the defrosting operation. Consequently, heat is generated by the brushless motor to be used for the defrosting and accordingly, the defrosting operation can be completed in a short period of time.

Other objects of the present invention will become obvious upon understanding of the illustrative embodiments about to be described. Various advantages not referred to herein will occur to those skilled in the art upon employment of the invention in practice.

BRIEF DESCRIPTION OF THE DRAWINGS

Several embodiments of the present invention will be described with reference to the accompanying drawings, in which.

DESCRIPTION OF THE PREFERRED EMBODIMENTS

A first embodiment of the present invention will be described with reference to FIGS. 1 to 6. In the embodiment, an air conditioner is incorporated with a heat pump including a compressor driven by a brushless motor, and the brushless motor is controlled by the pulse width modulation (PWM) system. A rotational position detection signal indicative of the rotational position of a rotor of the brushless motor is obtained by detecting the voltage (e. m. f.) induced at each of windings of the brushless motor and then electrically processing the detected voltage.

Figure 1:
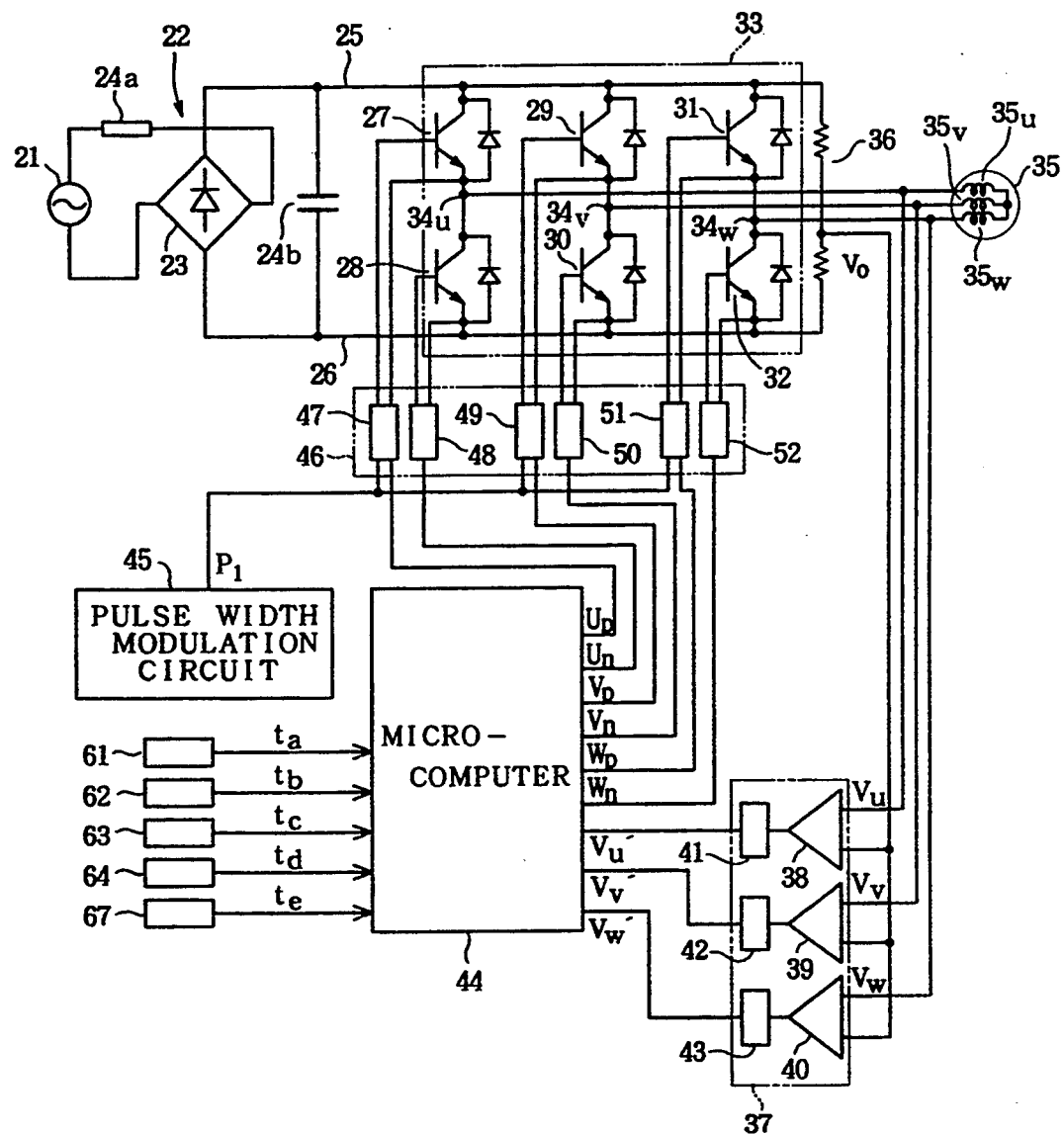
FIG. 1 is an electrical circuit diagram showing the inverter of a first embodiment in accordance with the present invention.
Figure 2:
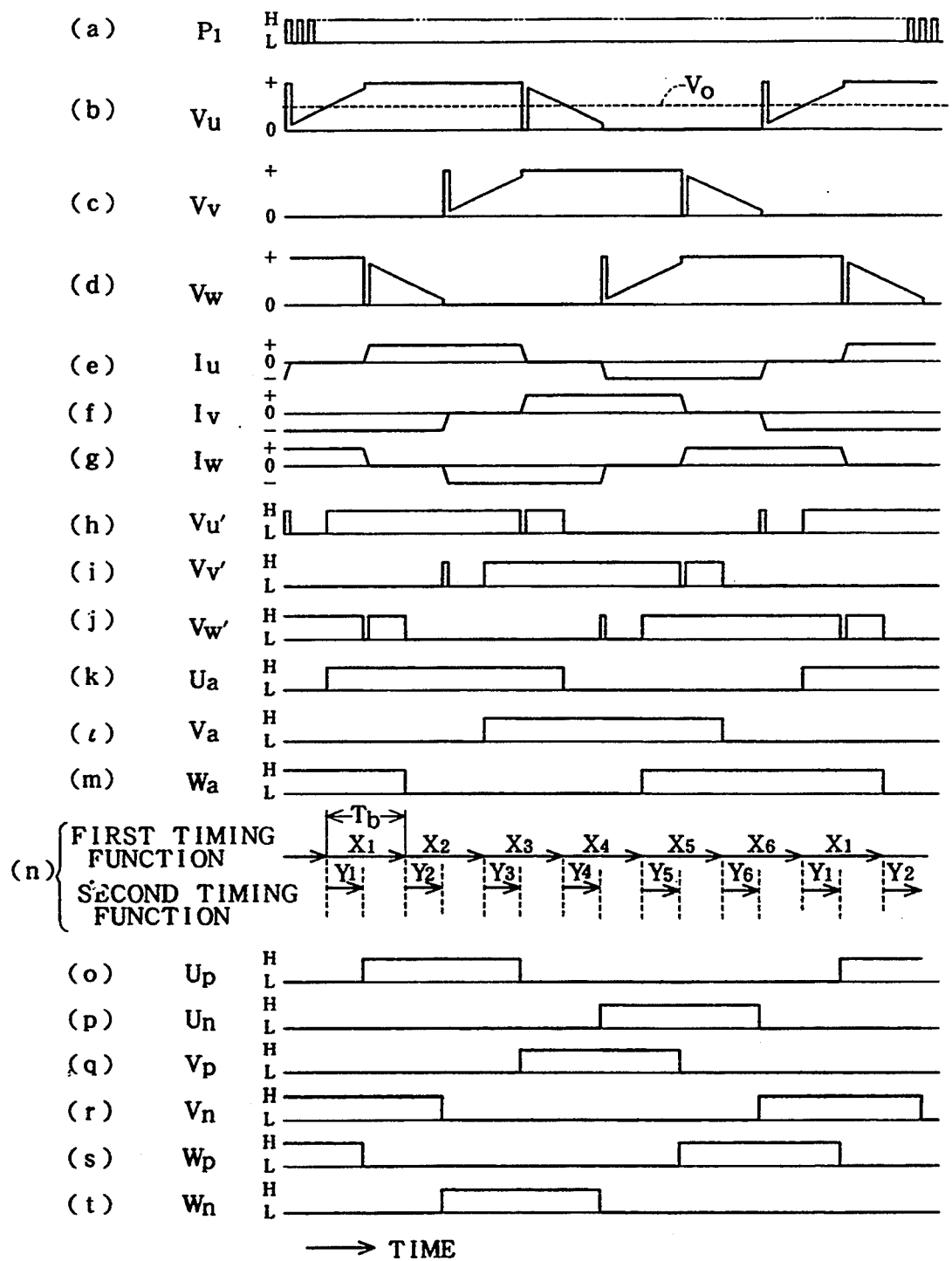
FIGS. 2(a) to 2(t) are waveform charts showing waveforms of various signals and voltages shown in FIG. 1 when the energization signal is formed in accordance with the normal energization signal forming pattern, with the timing function of each of first and second timers.
Figure 3:
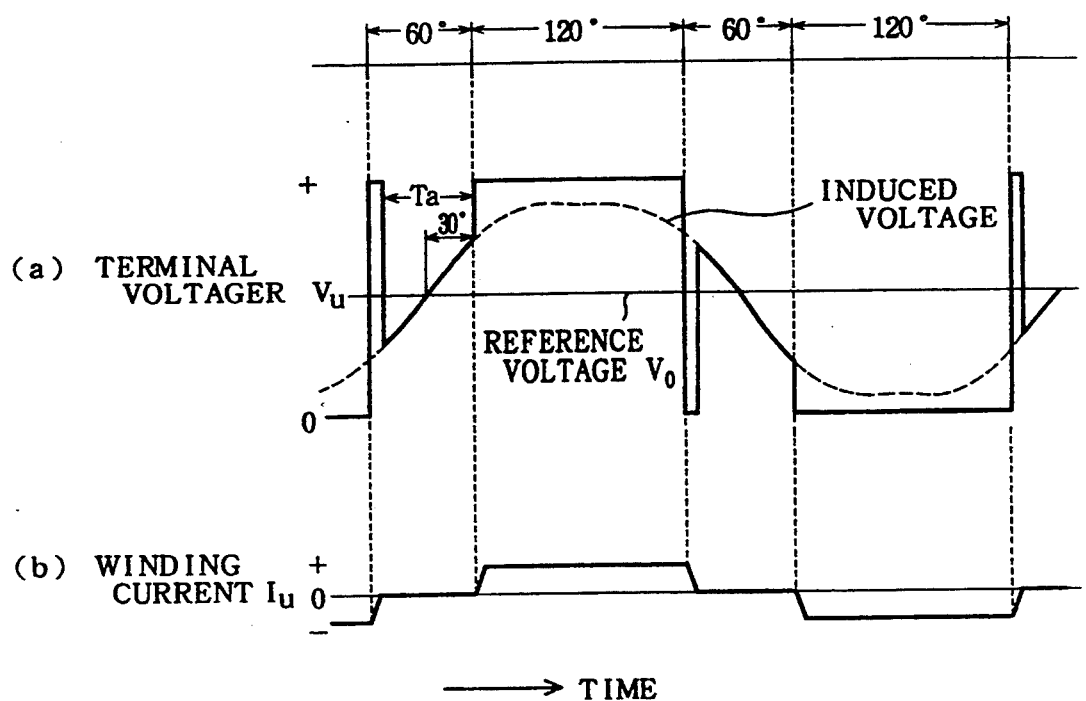
FIGS. 3(a) and 3(b) are waveform charts of the terminal voltage and the current of one of the windings of the brushless motor.
Figure 4:
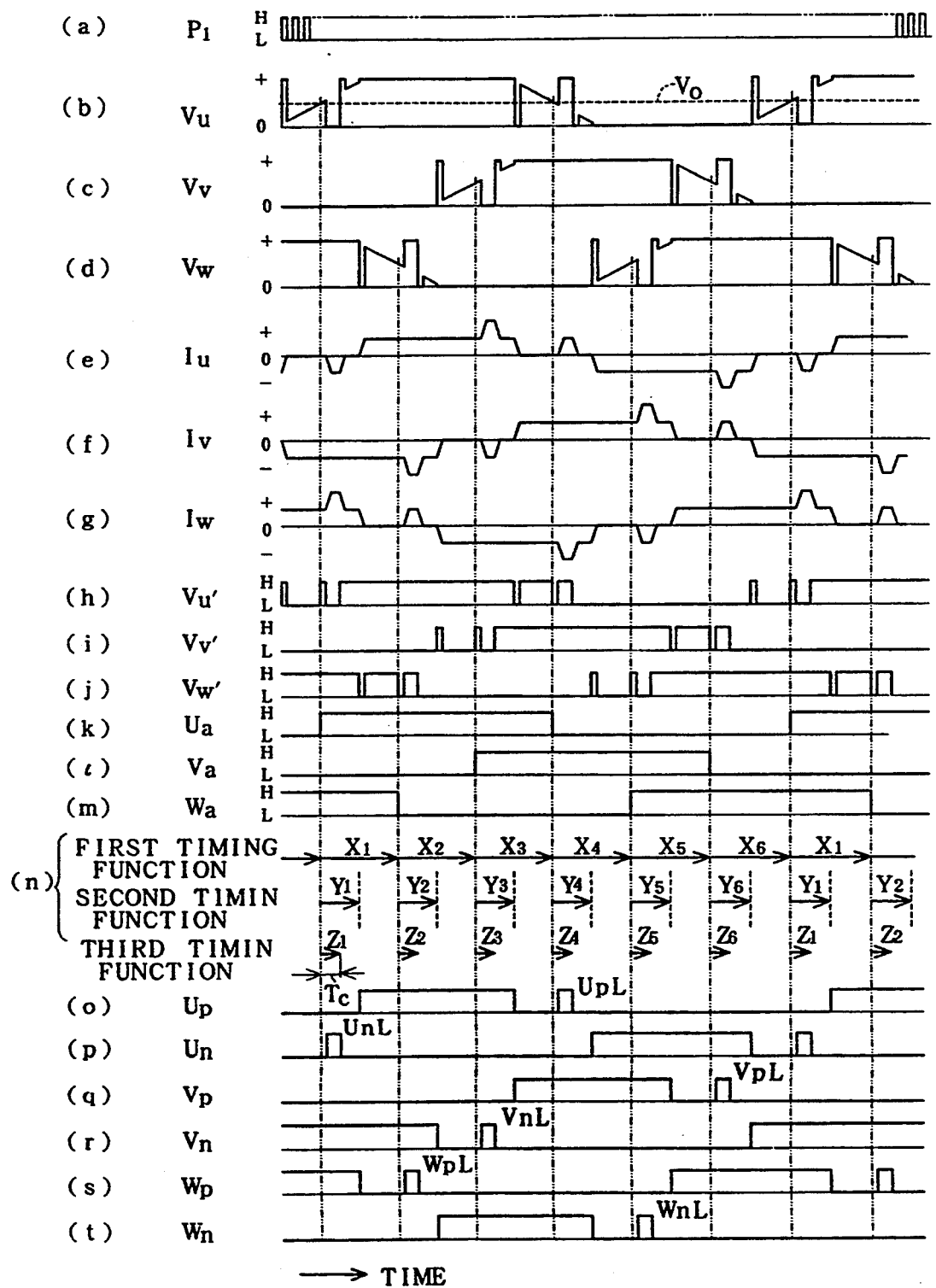
FIGS. 4(a) to 4(t) are waveform charts similar to FIGS. 2(a)-2(t) when the energization signal is formed in accordance with the loss increasing energization signal forming pattern.
Figure 5:
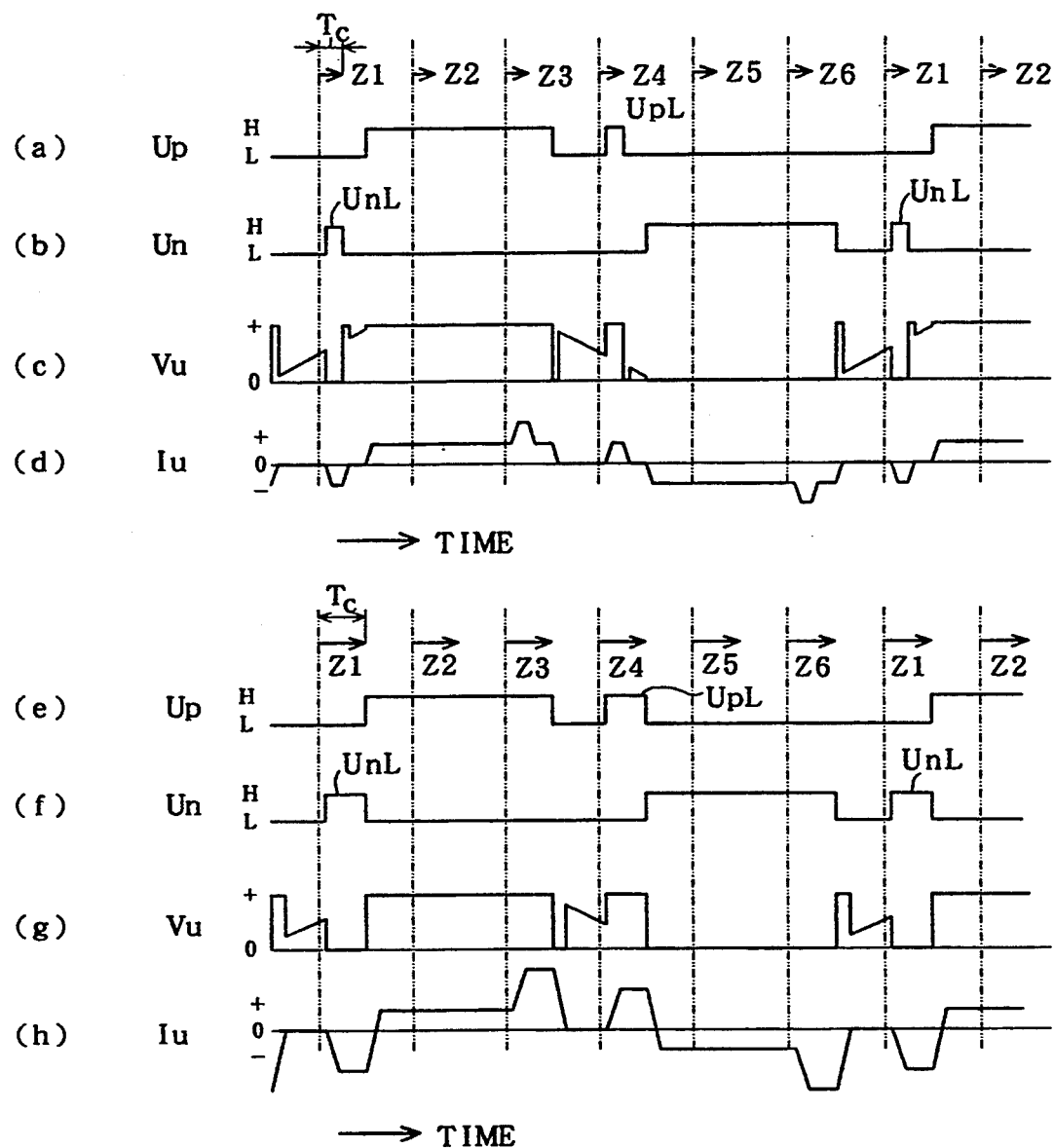
FIGS. 5(a) to 5(h) are waveform charts of the energization signal, the terminal voltage and the current regarding one of the windings of the brushless motor when the amount of loss is varied in the case where the energization signal is formed in accordance with the loss increasing energization signal forming pattern.

Referring to FIG. 1 showing the inverter, a DC power supply circuit 22 to be connected to an AC power supply source 21 includes a full wave rectifier circuit 23, a reactor 24a and a smoothing capacitor 24b. The DC power supply circuit 22 has two DC buses 25 and 26 between which buses a three-phase bridge circuit 33 serving as a switching circuit is connected. The three-phase bridge circuit 33 includes switching transistors 27 to 32 serving as switching elements. The three-phase bridge circuit 33 has output terminals 34u, 34v and 34w to which windings 35u, 35v and 35w of a three-phase four-pole brushless motor 35, for example, are connected respectively.

In the three-phase bridge circuit 33, three transistors 27, 29 and 31 connected between the positive bus 25 and the respective output terminals 34u, 34v, 35w serve as positive side switching elements. The other three transistors 28, 30, 32 connected between the negative bus 26 and the respective output terminals 34u, 34v, 34w serve as negative side switching elements. These switching transistors 27-32 are controlled to be turned on and off sequentially in a predetermined order so that the windings 35u, 35v, 35w of each phase of the brushless motor 35 are sequentially energized repeatedly with a phase difference of 120 degrees in the electrical angle, whereby the brushless motor is driven. Each switching transistor is controlled to be turned on for a period of 120 degrees and off for a period of 240 degrees. Furthermore, in the "on" period, the duty ratio of an energization signal supplied to each phase winding is controlled by a pulse width modulated signal $P_1$ as shown in FIG. 2(a) such that terminal voltages $V_u$, $V_v$ and $V_w$ of the windings 35u, 35v, 35w of the brushless motor 35 take waveforms shown in FIGS. 2(b), 2(c) and 2(d) respectively.

FIGS. 3(a) and 3(b) show waveforms of the terminal voltage $V_u$ and the current $I_u$ of one winding 35u of the brushless motor 35 without the duty ratio control by the pulse width modulated signal as mentioned above. In the waveform of the terminal voltage $V_u$, a positive or negative slope section $T_a$ in the electrical angle of 60 degrees represents a voltage induced in the winding $35u$ and elongated positive and negative pulses represent pulse voltages due to a diode U connected in parallel to the transistors 27, 28. Reference symbol $V_0$ represents a reference voltage provided by a resistance type potential divider circuit 36 connected between the DC buses 25, 26. As understood from FIGS. 3(a), 3(b), a commutation time lags by about 30 degrees behind a time when the induced voltage and the reference voltage $V_0$ cross, which time will be referred to as "zero crossing time."

The terminal voltages $V_u$, $V_v$, $V_w$ are compared with the reference voltage $V_0$ by respective comparators 38 to 40 provided in a position detecting circuit 37 serving as position detecting means, thereby being converted to respective fundamental wave signals $V_u'$, $V_v'$ and $V_w'$ for discrimination of 180-degree sections of the terminal voltages $V_u$, $V_v$, $V_w$ as shown in FIGS. 2(h)–2(j). These fundamental wave signals $V_u'$, $V_v'$ and $V_w'$ are supplied from the position detecting circuit 37 via respective photo couplers 41 to 43 to a microcomputer 44 serving as energization signal forming means. The fundamental wave signals $V_u'$, $V_v'$, $V_w'$ are converted by the microcomputer 44 to respective recognitive waveform signals $U_a$, $V_a$ and $W_a$ each comprising continuous square waves composed on of a positive pulse component and having a period of 180 degrees in electrical angle, as shown in FIGS. 2(k)–2(m). The recognitive waveform signals $U_a$, $V_a$, $W_a$ are out of phase with one another by 120 degrees. A rise point and a fall point of each recognitive waveform signal correspond to the above-mentioned zero crossing point.

The microcomputer 44 is provided with first and second timing functions (first and second timers), as shown in FIG. 2(n). Six first phase segment patterns X1 to X6 are formed from the three recognitive waveform signals $U_a$, $V_a$, $W_a$ by the first timing function. Each of the first phase segment patterns X1-X6 has a period $T_b$ of 60 degrees in electrical angle. Six second phase segment patterns Y1 to Y6 are formed by the second timing function. The second phase segment patterns Y1-Y6 have start points same as those of the first segment patterns X1-X6 respectively and each have a period of 30 degrees in electrical angle. The microcomputer 44 finally synthesizes, from signals of the above-mentioned second phase segment patterns, energization signals $U_p$, $U_n$, $V_p$, $V_n$, $W_p$ and $W_n$ as shown in FIGS. 2(o)–2(t) respectively.

The start points of the energization signals $U_p$, $U_n$, $V_p$, $V_n$, $W_p$ and $W_n$ correspond to the end points of the second phase segment patterns Y1-Y6 respectively and accordingly, lag behind the zero crossing point by 30 degrees. Consequently, phase patterns of the energization signals $U_p$, $U_n$, $V_p$, $V_n$, $W_p$ and $W_n$ correspond to commutation time patterns required of the transistors 27-32 of the three phase bridge circuit 33.

On the other hand, the microcomputer 44 determines a rotational speed of the brushless motor per unit period from the number of times of generation of periods of six patterns (corresponding to a half turn of the brushless motor) or twelve patterns (corresponding to one turn). The microcomputer 44 then compares the determined speed with a speed command value to determine the speed deviation. The microcomputer 44 further supplies, to a pulse width modulation circuit 45, a duty ratio signal $S_d$ in accordance with the determined speed deviation. The pulse width modulation circuit 45 generates a pulse width modulated signal $P_1$ with a duty ratio subject to the duty ratio signal $S_d$.

The pulse width modulated signal $P_1$ whose duty ratio has been controlled as described above is supplied to gates 47, 49 and 51 of a gate circuit 46 composing a drive circuit. Base control signals are synthesized from the pulse width modulated signal $P_1$ and each of the energization signals $U_p$, $V_p$, $W_p$ by the gates 47, 49, 51 or more specifically, the pulse width modulated signal $P_1$ is ANDed with each of the energization signals $U_p$, $V_p$, $W_p$ by the gates 47, 49, 51, for example, and resultant signals are supplied as base control signals to the bases of the transistors 27, 29, 31 of the three-phase bridge circuit 33 such that these transistors 27-32 are controlled to be turned on and off by the energization signals $U_p$, $U_n$, $V_p$, $V_n$, $W_p$, $W_n$ with the patterns as shown in FIGS. 2(o)–(t) respectively. Thus, the brushless motor 35 is driven and its speed is controlled by the control of the duty ratio by the pulse width modulated signal $P_1$ as shown in FIG. 2(a).

Although the terminal voltages $V_u$, $V_v$, $V_w$ and the fundamental waveform signals $V_u'$, $V_v'$, $V_w'$ actually take the waveforms accompanied with the pulse width modulated signal, such waveforms are eliminated in FIGS. 2(b)–(d) and 2(h)–(j).

The patterns of the energization signals $U_p$, $U_n$, $V_p$, $V_n$, $W_p$, $W_n$ formed as described above correspond to a normal energization signal forming pattern for driving the brushless motor 35 with high efficiency. The brushless motor 35 is usually controlled in accordance with the normal energization signal forming pattern in the normal operation as described above.

Energization signals formed in accordance with a loss increasing energization signal forming pattern and providing low motor efficiency will now be described. These energization signals formed in accordance with the loss increasing energization signal forming pattern are employed in the defrosting operation or the like. The control manner for the defrosting operation of the heat pump type air conditioner will be described later.

Referring to FIGS. 4(a)–4(t), the loss increasing energization signal forming pattern differs from the above-described normal energization signal forming pattern in that loss increasing energization signals $U_{nL}$, $W_{pL}$, $V_{nL}$, $U_{pL}$, $W_{nL}$ and $V_{pL}$ are formed at an initial stage of the respective first phase segment patterns X1-X6. More specifically, in execution of the loss increasing energization signal forming pattern, a third timing function of the microcomputer 44 performs a timing operation. Loss increasing energization signal forming periods Z1 to Z6 are measured by the third timing function. The loss increasing energization signal forming periods Z1-Z6 start at the end points of the respective first phase segment patterns X1-X6 and each have a period $T_c$. The microcomputer 44 starts forming the loss increasing energization signals $U_{nL}$, $W_{pL}$, $V_{nL}$, $U_{pL}$, $W_{nL}$, $V_{pL}$ immediately after start of the respective periods Z1-Z6 and continues the signal formation until the end points of the respective periods Z1-Z6 are reached.

Reverse currents are induced in the windings $35u$, $35v$, $35w$ by the loss increasing energization signals $U_{nL}$, $W_{pL}$, $V_{nL}$, $U_{pL}$, $W_{nL}$, $V_{pL}$ in the respective first segment patterns X1-X6, thereby causing the rotor to develop a counter torque. Consequently, since the efficiency of the brushless motor is lowered and the loss is increased, an amount of current flowing in each of the windings 35u, 35v, 35w is increased and accordingly, an amount of heat generated by each winding is increased.

The period $T_c$ of each of the loss increasing energization signal forming periods Z1-Z6 can be varied, that is, lengthened and shortened so that the loss of the brushless motor 35 and the amount of heat generated by each winding are increased and decreased, as shown in FIGS. 5(a)-5(d) and 5(e)-(h) showing the case of one winding 35u. The maximum of the period $T_c$ is determined to be one half of the period $T_b$ of each of the first phase segment patterns X1-X6.

Figure 6:
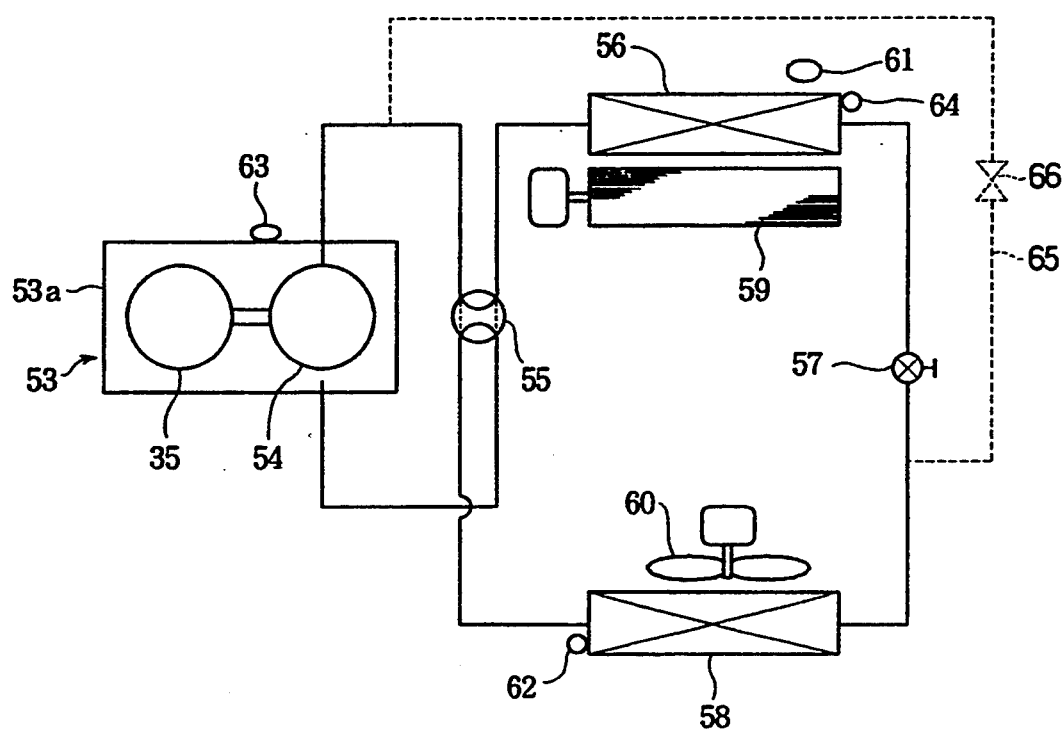
FIG. 6 is a schematic diagram showing the arrangement of the heat pump employed in the air conditioner.

The following describes the relation between the control manner in the defrosting operation of the heat pump type air conditioner and the control of the brushless motor 35. Referring to FIG. 6 showing a heat pump employed in the air conditioner, a compressor 53 is comprised of a closed iron container 53a enclosing a compressing section 54 and the brushless motor 35 having a rotor shaft coupled to the compressing section 54. The compressor 53, a four way valve 55, an indoor heat exchanger 56, a pressure reducer 57 and an outdoor heat exchanger 58 are connected by a pipe serving as a refrigerant path so that a closed loop is provided.

The four way valve 55 is in the state shown by solid line in FIG. 6 in the warming operation. High temperature refrigerant compressed by the compressing section 54 of the compressor 53 is supplied through the four way valve 55 to the indoor heat exchanger 56 in which the compressed refrigerant is condensed. Thereafter, the pressure of the refrigerant is reduced by the pressure reducer 57. The low temperature refrigerant is caused to flow into the outdoor heat exchanger 58 where the refrigerant is evaporated to be returned to the compressor 53.

The four way valve 55 is switched to the state shown by broken line in FIG. 6 in the cooling operation. The high temperature refrigerant compressed by the compressing section 54 of the compressor 53 is supplied through the four way valve 55 to the outdoor heat exchanger 58 in which the refrigerant is condensed. The pressure of the refrigerant is then reduced by the pressure reducer 57. The low temperature refrigerant is supplied to the indoor heat exchanger 56 where the refrigerant is evaporated to be returned to the compressor 53.

Fans 59 and 60 are provided to supply air to the outdoor and indoor heat exchangers 56, 58 respectively so that heat exchange is efficiently caused between the indoor and outdoor airs in the heat exchangers 56, 58.

In the operation, the room temperature is detected by a temperature sensor 61 provided at an air suction side of the indoor heat exchanger 56 and a detection signal $t_a$ indicative of the detected temperature is supplied from the temperature sensor 61 to the microcomputer 44. Based on the difference between the temperature indicated by the detection signal $t_a$ generated by the temperature sensor 61 and a set temperature, the microcomputer 44 sets the speed command value for the brushless motor 35 so that the speed of the brushless motor 35 is controlled by the duty ratio control by the pulse width modulated signal $P_1$ as described above. Another temperature sensor 62 is provided on the outdoor heat exchanger 58 for detecting the temperature thereof. A detection signal $t_b$ indicative of the detected temperature is supplied from the temperature sensor 62 to the microcomputer 44. Based on the detection signal $t_b$, the microcomputer 44 determines the state of frost formation on the outdoor heat exchanger 58. Further another temperature sensor 63 is provided on the container 53a of the compressor 53 for detecting the temperature thereof, thereby generating a detection signal $t_c$ indicative of the detected temperature. Further another temperature sensor 64 is provided on the indoor heat exchanger 56 for detecting the temperature thereof, thereby generating a detection signal $t_d$ indicative of the detected temperature. These detection signals are also supplied to the microcomputer 44.

The control manner of the microcomputer 44 will now be described. A preparatory defrosting operation is initiated when the microcomputer 44 determines that the defrosting is necessary, on the basis of the detection signal $t_b$. In the preparatory defrosting operation, with the heat pump maintained in the warming cycle, the indoor fan 59 is operated at a low speed or interrupted, the pressure reducer 57 is throttled, or the speed of the brushless motor 35 is increased over the speed command value based on the detection signal $t_a$ indicative of the detected room temperature, so that the compressor 53 generates heat.

Although whether the preparatory defrosting operation should be initiated or not is determined on the basis of the temperature of the outdoor heat exchanger 58, the determination may be based on the temperature changes of the indoor heat exchanger 56, changes in the difference between the temperature of the indoor heat exchanger 56 and the room temperature, changes in the difference between the temperature of the outdoor heat exchanger 58 and the outdoor temperature, or a rate of each of these temperature changes.

Upon initiation of the preparatory defrosting operation, the microcomputer 44 switches the inverter 33 from a normal operation mode by the normal energization signal forming pattern to an operation mode by the loss increasing energization signal forming pattern wherein the motor efficiency is lower than that in the normal operation. Consequently, not only the compressing section 54 but also the brushless motor 35 generate a large amount of heat during the preparatory defrosting operation and accordingly, an amount of heat generated by the compressor 53 is increased as compared with in the normal operation, resulting in rapid increase in the temperature of the compressor 53. In the preparatory defrosting operation, with the heat pump maintained in the warming cycle, the indoor fan 59 is operated at a low speed or interrupted, the pressure reducer 57 is throttled, or the speed of the brushless motor 35 is increased over the speed command value based on the detection signal $t_a$ indicative of the detected room temperature, so that the compressor 53 generates heat. In the defrosting operation in the embodiment, too, the indoor fan 59 may be operated at a low speed or interrupted, the pressure reducer 57 may be throttled, or the speed of the brushless motor 35 may be increased over the speed command value based on the detection signal $t_a$ indicative of the detected room temperature, in addition to the control of the brushless motor 35 on the basis of the loss increasing pattern. The preparatory defrosting operation is completed and the defrosting operation is initiated when the temperature of the compressor 53 detected by the temperature sensor 63 has been increased to a predetermined value or above as the result of execution of the preparatory operation or when the preparatory defrosting operation has been performed for a predetermined period of of time.

In the defrosting operation following the preparatory defrosting operation, the four way valve 55 is switched to the cooling cycle, or the refrigerant discharged from the compressor 53 is directly supplied through a bypass 65 to an inlet of the outdoor heat exchanger 58 with the four way valve 55 maintained in the warming cycle. A normally closed valve 66 provided in the bypass 65 is opened for this purpose.

When the air conditioner is switched to the defrosting operation after completion of the preparatory defrosting operation, the microcomputer 44 continuously instructs the inverter 33 to operate in accordance with the loss increasing energization signal forming pattern providing low motor efficiency. Accordingly, the brushless motor 35 generates a large amount of heat during execution of the defrosting operation, too, which heat is utilized for the defrosting. Consequently, the time period of the defrosting operation can be largely shortened. Thereafter, the microcomputer 44 determines completion of the defrosting operation when detecting sudden increase in the temperature of the outdoor heat exchanger 58 on the basis of the detection signals $t_b$ generated by the temperature sensor 62. The four way valve 55 is reswitched to the warming cycle when having switched to the cooling cycle for execution of the defrosting operation. The valve 66 is closed when the bypass 65 has been opened for execution of the defrosting operation, so that the air conditioner is returned to the warming operation.

With return to the warming operation, the microcomputer 44 switches the operation mode from the loss increasing energization signal forming pattern to the normal energization signal forming pattern providing high motor efficiency.

The lubricating oil is cooled and its performance is lowered since the temperature of the refrigerant has dropped after completion of the defrosting operation. For the purpose of improvement of the performance of the lubricating oil in the compressor 53, a timer (not shown) may be operated upon completion of the defrosting operation so that the operation mode is switched to the normal pattern after a lag time or after lapse of a predetermined period of time.

The case where the rise rate of the temperature of the compressor 53 is small during the operation of the air conditioner will now be described. The temperature of the compressor 53 is usually maintained at about 80° C. during the normal operation. The compressor 53 is maintained at a temperature much lower than 80° C. when the brushless motor 35 is turned on and off alternately at short intervals. In this case, the operation of the air conditioner is performed with the compressor temperature low. The viscosity of a lubricating oil of the compressor 53 merged into the refrigerant is reduced when the difference between the compressor temperature and that of the heat exchanger serving as the condenser, which heat exchanger is an indoor heat exchanger 56 in the warming operation and an outdoor heat exchanger 58 in the cooling operation, becomes small. Consequently, the lubricity of the lubricating oil is reduced, which may damage the compressor 53. For the purpose of the prevention of reduction in the lubricity, it is effective that the compressor 53 itself is caused to generate heat, when the difference between the temperatures of the compressor 53 and the heat exchanger serving as the condenser is decreased to a predetermined value or below during the operation.

In view of the foregoing, the microcomputer 44 switches the operation mode of the brushless motor 35 from the normal pattern to the loss increasing energization signal forming pattern, when the difference between the compressor temperature indicated by the detection signal $t_c$ generated by the temperature sensor 63 and the temperature indicated by the detection signal $t_d$ generated by the temperature sensor 64 provided on the indoor heat exchanger 56 has decreased to a predetermined value or below in the warming operation. On the other hand, in the cooling operation, the microcomputer 44 switches the operation mode of the brushless motor 35 from the normal pattern to the loss increasing pattern, when the difference between the compressor temperature indicated by the detection signal $t_c$ generated by the temperature sensor 63 and the temperature indicated by the detection signal $t_b$ generated by the temperature sensor 62 provided on the outdoor heat exchanger 58 is decreased to a predetermined value or below. Consequently, since the temperature of the compressor 53 is increased with increase in the temperature of the brushless motor 35, the reduction in the lubricity of the lubricating oil can be prevented, which results in improvement of the operational reliability of the compressor 53.

The brushless motor 35 is thus operated in accordance with the loss increasing energization signal forming pattern in each of the cases where the preparatory defrosting operation is performed, where the defrosting operation is performed, and where the temperature of the compressor 53 does not readily rise during the normal operation, as described above. In these cases, the microcomputer 44 sets the period $T_c$ of each of the loss increasing energization signals $U_{nL}$, $W_{pL}$, $V_{nL}$, $U_{pL}$, $W_{nL}$, $V_{pL}$ to a value in accordance with the temperature of the outdoor heat exchanger 58 indicated by the detection signal $t_b$ generated by the temperature sensor 62, the difference between the temperature of the compressor 53 indicated by the detection signal $t_c$ generated by the temperature sensor 63 and the temperature of the indoor heat exchanger 56 indicated by the detection signal $t_d$ generated by the temperature sensor 64, or the difference between the detected temperature of the compressor 53 and the detected temperature of the outdoor heat exchanger 58, thereby setting the amount of heat generated by the brushless motor 35 to the values necessary for the respective cases.

A temperature sensor 67 is further provided for detecting the temperature in the ambience of the three-phase bridge circuit 33, thereby generating a detection signal $t_e$ indicative of the detected temperature. The detection signal $t_e$ is supplied to the microcomputer 44. When the temperature indicated by the detection signal $t_e$ exceeds a predetermined value while the defrosting operation is being performed in accordance with the loss increasing pattern, the microcomputer 44 shortens the period $T_c$ of each of the loss increasing signal forming periods Z1–Z6, whereby the amount of heat generated by the brushless motor 35 is restricted so that the temperatures of the switching transistors 27–32 and other parts are prevented from being abnormally increased.

According to the above-described embodiment, even in the brushless motor 35 controlled by the inverter 33, its efficiency can be reduced for increase in the amount of generated heat when the amount of generated heat needs to be increased or more specifically, in the preparatory defrosting operation, the defrosting operation or when the temperature of the compressor has dropped during the normal operation. Consequently, the time period of the defrosting for the outdoor heat exchanger 56 can be shortened and the operational reliability of the compressor 53 can be improved.

A positive or negative potential at the DC power supply circuit 22 appears in the terminal voltages $V_u$, $V_v$, $V_w$ as the result of generation of the loss increasing energization signals $U_{nL}$, $W_{pL}$, $V_{nL}$, $U_{pL}$, $W_{nL}$, $V_{pL}$. In this case, there is a possibility that the zero crossing time when each of the induced voltages $V_u$, $V_v$, $V_w$ and the reference voltage $V_{0cross}$ cannot be detected. In view of this drawback, however, when the brushless motor 35 is controlled in accordance with the loss increasing pattern, the loss increasing energization signals $U_{nL}$, $W_{pL}$, $V_{nL}$, $U_{pL}$, $W_{nL}$, $V_{pL}$ are formed immediately after determination of the commutation time, that is, at a time slightly after the zero crossing time within a period in which only the voltage induced at each winding appears. Consequently, the above-described drawback can be overcome in the embodiment.

The period of time between one zero crossing time and the subsequent one is measured by the first timing function. The period of time between the zero crossing time and the commutation time is operated on the basis of the time period measured by the first timing function. The counting operation is performed by the second timing function for the operated time period. The commutation time is determined to be a time when the counting operation by the second timing function is completed. Consequently, the commutation time can readily be determined in accordance with the program stored in the microcomputer even when the time period between the zero crossing time and the time according to the commutation time differs from case to case depending upon the speed of the rotor.

Furthermore, since the period $T_c$ of each of the loss increasing energization signals $U_{nL}$, $W_{pL}$, $V_{nL}$, $U_{pL}$, $W_{nL}$, $V_{pL}$ is also measured by the third timing function, it can readily be determined in accordance with the computer program.

Since the information about the rotor position is obtained by comparison of each of the winding terminal voltages $V_u$, $V_v$, $V_w$ with the reference voltage $V_0$ in the embodiment, provision of a position sensor comprising a magnetic detecting element such as a Hall element can be eliminated. Furthermore, the reference voltage $V_0$ is set at one half of the voltage of the DC power supply circuit 22 in the embodiment. When the reference voltage is set at a value other than one half of the DC power supply voltage, the time when each of the terminal voltages $V_u$, $V_v$, $V_w$ and the reference voltage cross is not fixed in relation with the commutation time. In this case, it is difficult to determine the commutation time. To avoid this drawback, two reference voltages need to be set so as to have high and low potential values respectively so that the zero crossing time is fixed in relation with the commutation time. However, this setting of the two reference values complicates the circuit arrangement.

The commutation time is determined on the basis of the result of comparison of each of the terminal voltages $V_u$, $V_v$, $V_w$ with the reference voltage $V_0$ in the foregoing embodiment. Alternatively, one or more magnetic detecting elements such as Hall elements may be provided for detecting magnetism from the magnet rotor of the brushless motor to thereby detect the rotor position so that the commutation time is determined on the basis of detection signals from the magnetic detecting elements.

Figure 7:
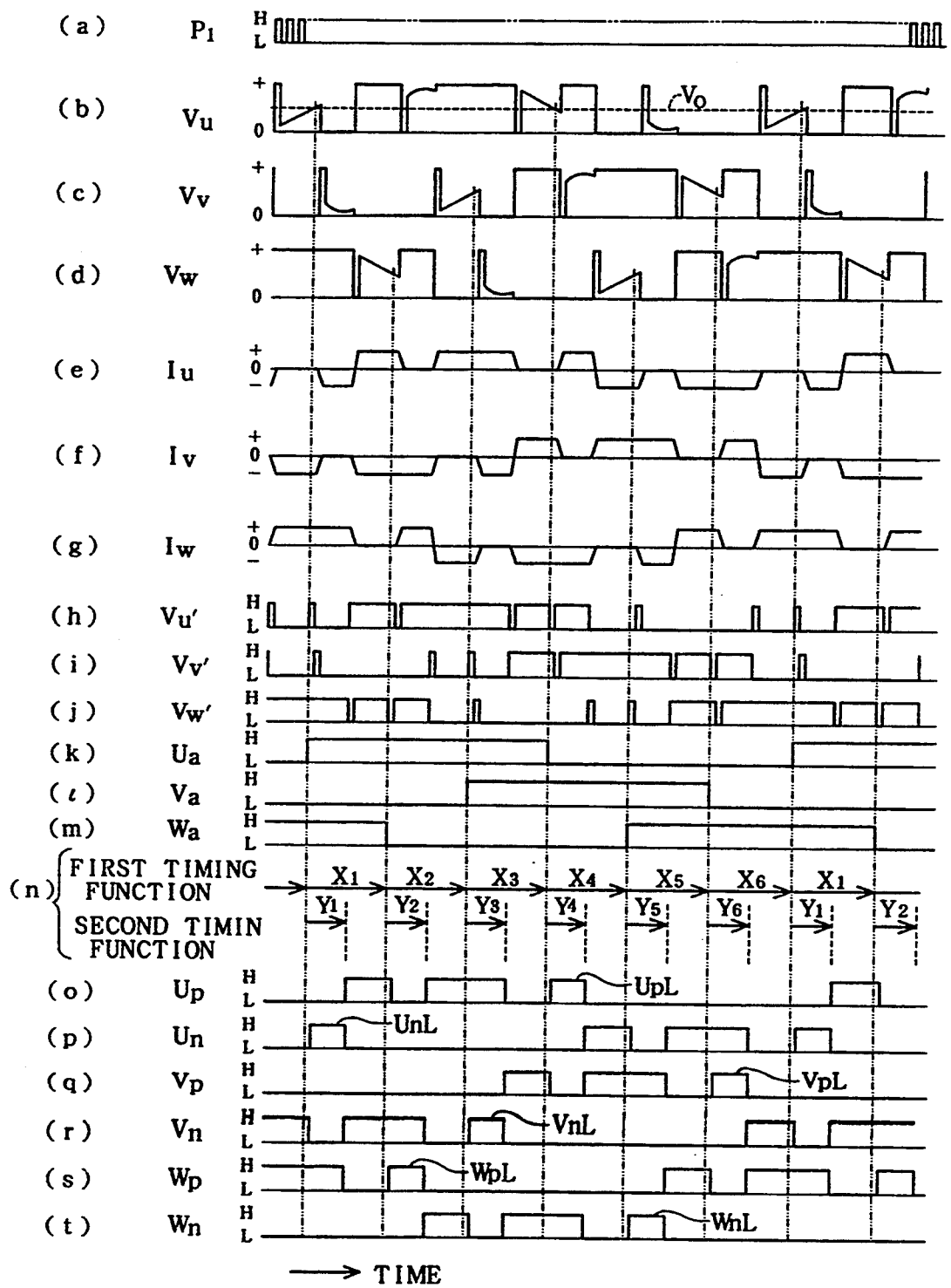
FIGS. 7(a) to 7(t) are waveform charts similar to FIGS. 4(a)–4(t) in the case of the inverter of a second embodiment.
Figure 8:
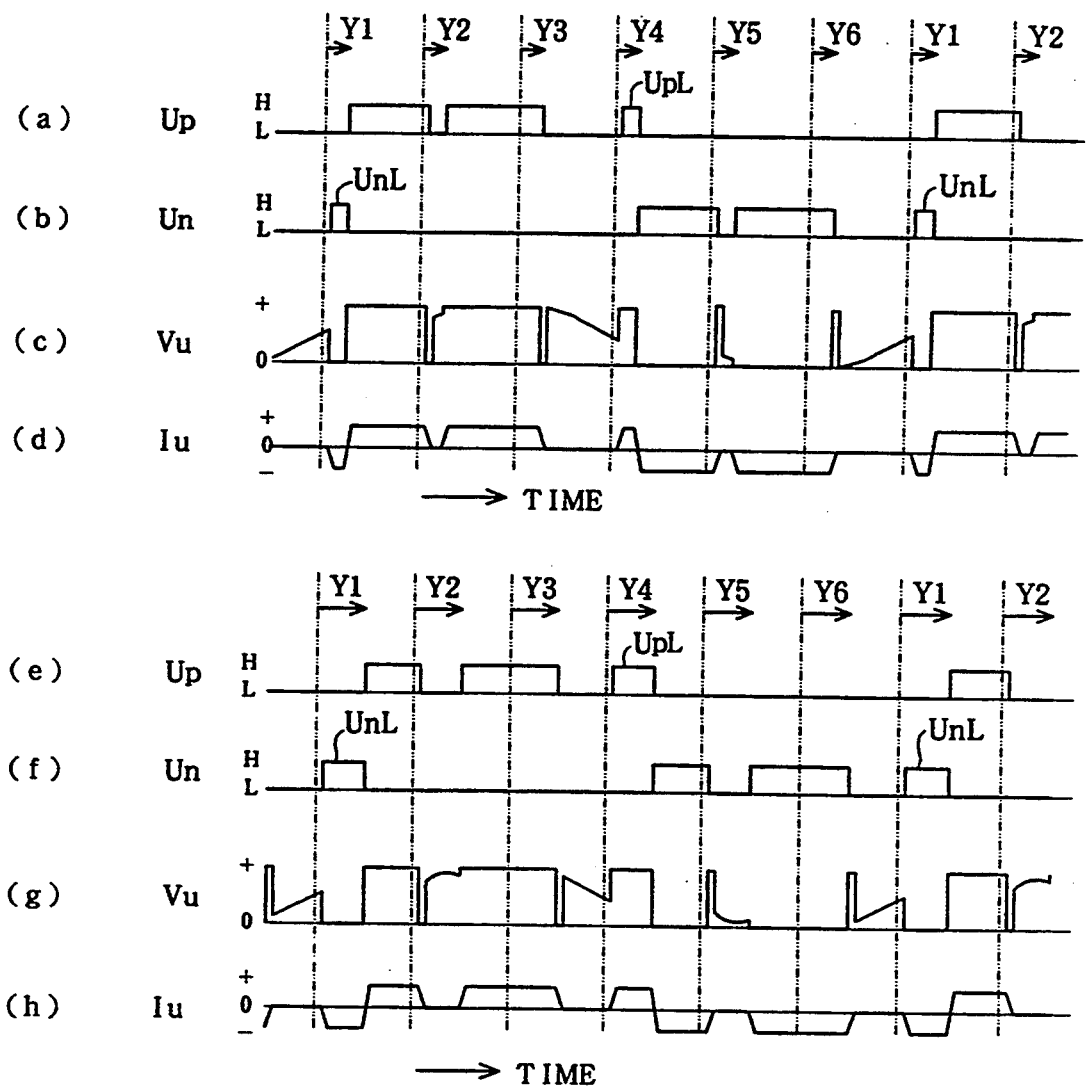
FIGS. 8(a) to 8(h) are waveform charts similar to FIGS. 5(a)-5(h)

FIGS. 7(a)–7(t) illustrate the loss increasing patterns in a second embodiment of the invention. The third timing function as employed in the inverter of the foregoing embodiment is eliminated in the second embodiment. Formation of the loss increasing energization signals $U_{nL}$, $W_{pL}$, $V_{nL}$, $W_{nL}$ and $V_{pL}$ is initiated immediately after the second timing function starts measuring the period of each of the second phase segment patterns Y1–Y6. The formation of the loss increasing energization signals is continued until the second timing function completes the measurement. The energization signals $U_n$, $V_n$, $W_n$ are not formed while the loss increasing energization signals $U_{nL}$, $V_{nL}$, $W_{nL}$ are being formed. The energization signals $U_p$, $V_p$, $W_p$ are not formed while the loss increasing energization signals $U_{pL}$, $V_{pL}$, $W_{pL}$ are being formed.

The period of each of the loss increasing energization signal forming periods Z1–Z6 can be varied, that is, lengthened and shortened so that the amount of heat generated by the brushless motor 35 is adjusted according to the temperature of the outdoor heat exchanger, as shown in FIGS. 8(a)–8(h) showing the case of one winding 35u.

When one of the positive side transistors 27, 29, 31 is driven by the loss increasing energization signals $U_{pL}$, $V_{pL}$, $W_{pL}$ in the period of the second phase segment patterns Y1–Y6, the other positive side transistors are not driven. Also, when one of the negative side transistors 28, 30, 32 is driven by the loss increasing energization signals $U_{nL}$, $V_{nL}$, $W_{nL}$, the other negative side transistors are not driven. Accordingly, the winding producing the counter torque can be supplied with as much current as possible and the windings each producing the positive torque can be supplied with as little current as possible. Consequently, since the efficiency of the brushless motor can be further reduced, its loss can be further increased, which increases the amount of current flowing into each of the windings 35u, 35v, 35w and accordingly, increases the amount of heat generated by them.

Figure 9:
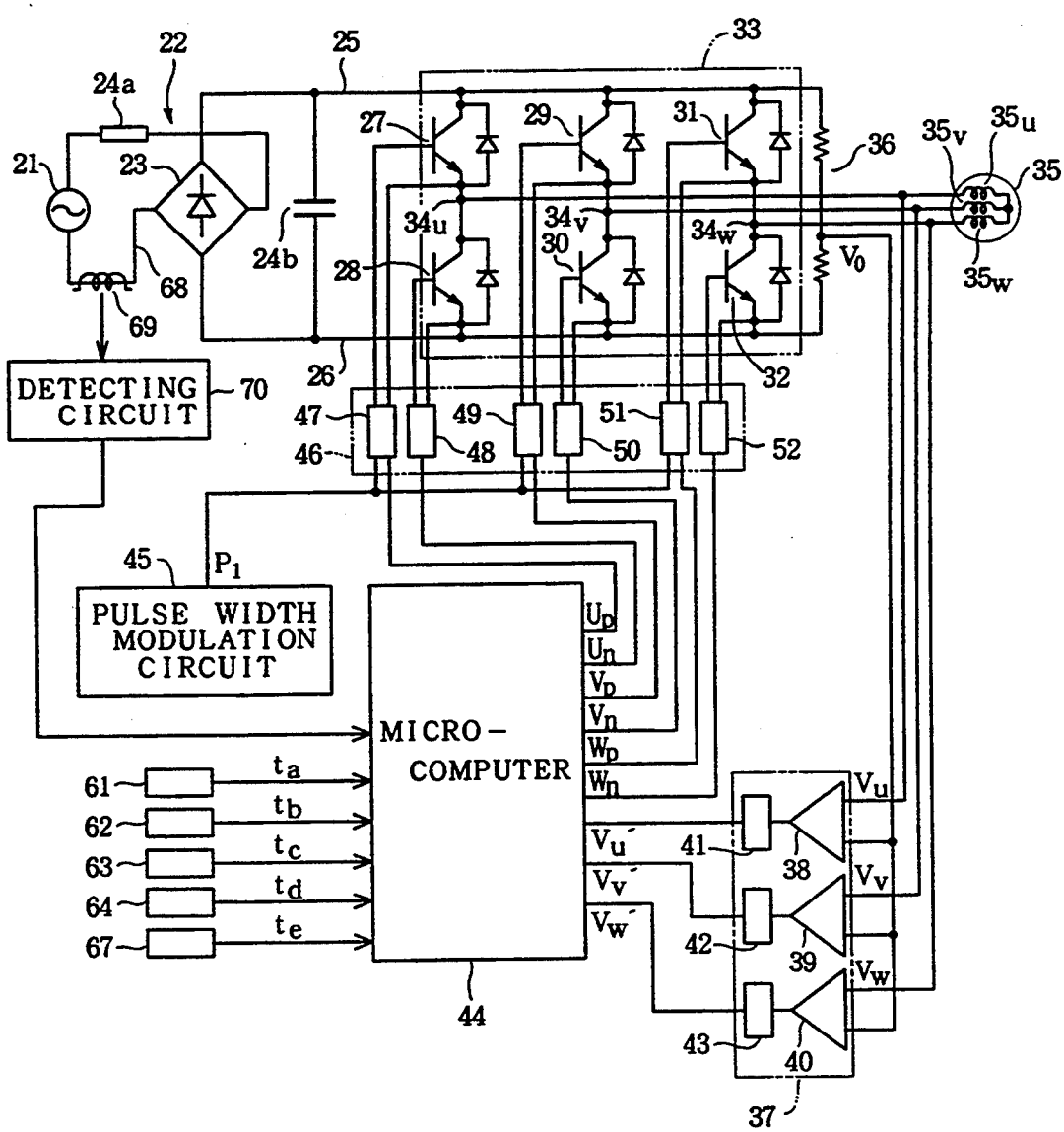
FIG. 9 is an electric circuit diagram similar to FIG. 1 showing the inverter of a third embodiment.
Figure 10:
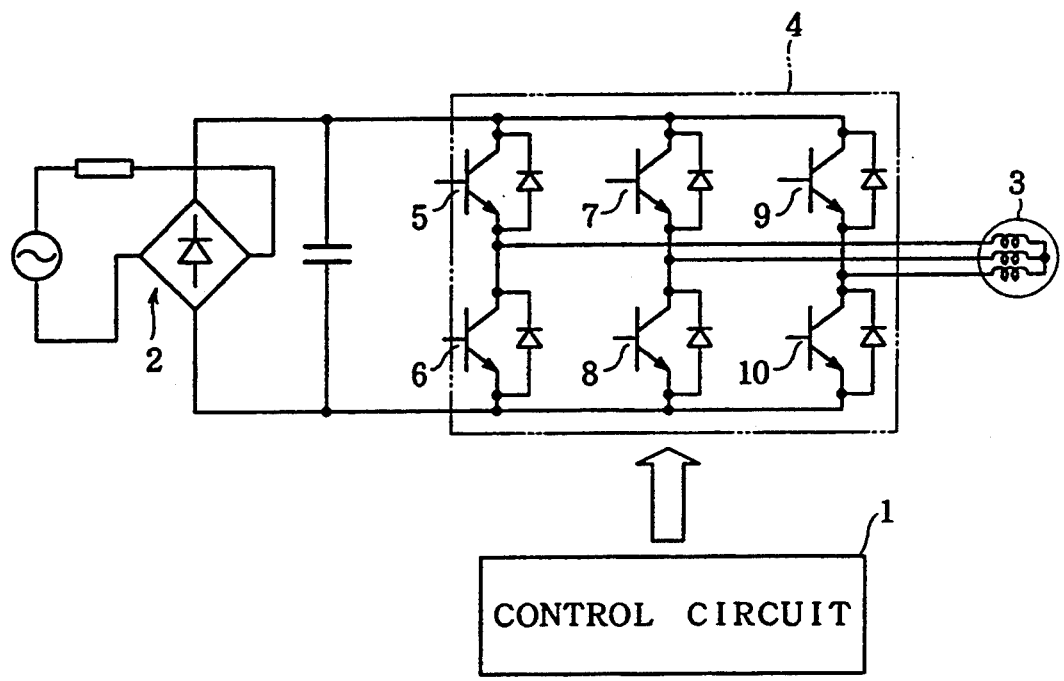
FIG. 10 is a schematic circuit diagram of an inverter controlling the induction motor in the prior art.
Figure 11:
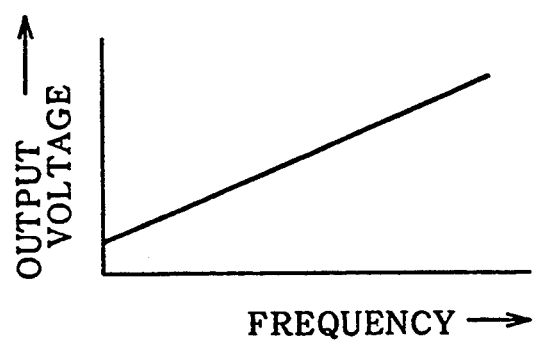
FIG. 11 is a graph showing the relationship between the output voltage and the frequency in the inverter shown in FIG. 10.
Figure 12:
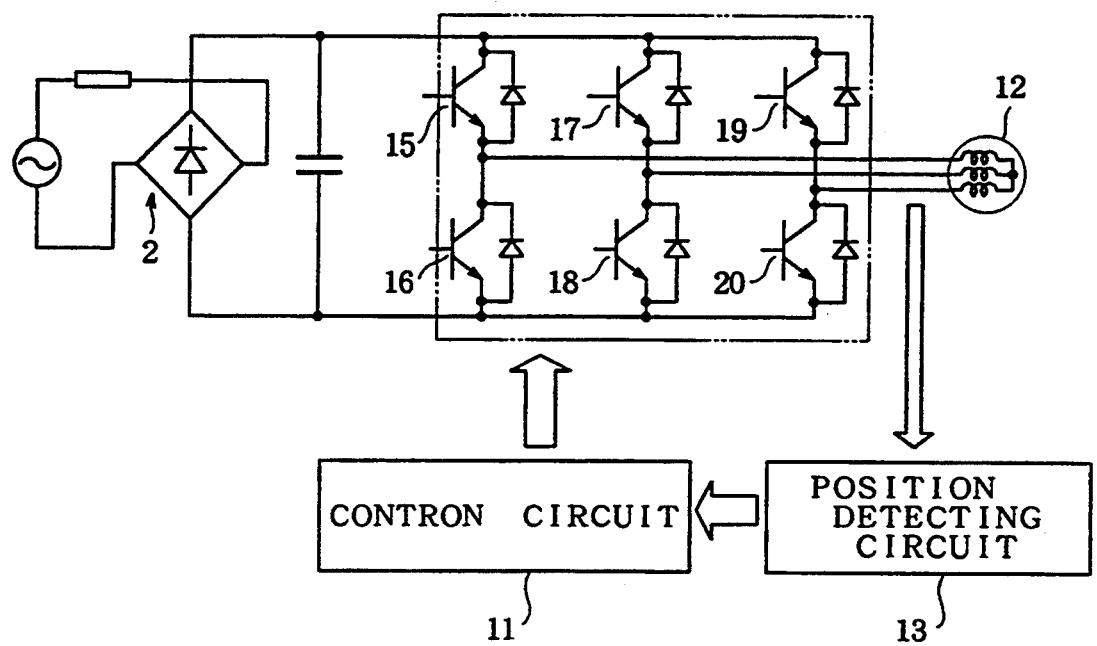
FIG. 12 is a schematic circuit diagram of an inverter controlling the brushless motor in the prior art.

FIG. 9 illustrates a third embodiment of the invention. Identical parts are labeled by the same reference numerals as those in the first embodiment and the description of these parts are eliminated.

One power supply line 68 connecting the DC power supply circuit 22 to the AC power source is provided with a current transformer 69 serving as current detecting means. A detection signal generated by the current transformer 69 is supplied through a detecting circuit 70 to the microcomputer 44. Based on the detection signal from the current transformer 69, the microcomputer 44 detects the current supplied through the power supply line 68 to the three-phase bridge circuit 33. The microcomputer 44 obtains, from the detected currents, an increase in the current when the energization signal has been switched from the normal pattern to the loss increasing pattern. The microcomputer 44 then compensates the period of each of the loss increasing energization signals $U_{nL}$, $V_{nL}$, $W_{nL}$, $U_{pL}$, $V_{pL}$, $W_{pL}$ so that the obtained current increase corresponds to the loss set on the basis of the temperatures detected by the temperature sensors 62–67 and the like, thereby compensating the amount of heat generated by the brushless motor 35. Detection of the current supplied to the three-phase bridge circuit 33 may be performed by detecting the current flowing into either DC bus 25 or 26.

The foregoing disclosure and drawings are merely illustrative of the principles of the present invention and are not to be interpreted in a limiting sense. The only limitation is to be determined from the scope of the appended claims.

We claim:

1. An inverter comprising:
   a) a switching circuit including a plurality of switching elements sequentially energizing windings of a plurality of phases of a brushless motor driving a compressor of a heat pump;
   b) a pulse width modulation circuit for obtaining a pulse width modulated signal;
   c) position detecting means for detecting a rotational position of a rotor of the brushless motor, thereby generating a position detection signal;
   d) energization signal forming means determining a commutation time on the basis of the position detection signal generated by the position detecting means and forming an energization signal corresponding to the determined commutation time, the energization signal forming means having a normal energization signal forming pattern and a loss increasing energization signal forming pattern wherein an efficiency of the brushless motor is lower than in the normal energization signal forming pattern, the energization signal forming means switching from the normal energization signal forming pattern to the loss increasing energization signal forming pattern in a predetermined period during drive of the brushless motor; and
   e) a drive circuit synthesizing the energization signal and the pulse width modulated signal, thereby obtaining a signal for driving each switching element.

2. An inverter comprising:
   a) a switching circuit including a plurality of switching elements sequentially energizing windings of a plurality of phases of a brushless motor driving a compressor of a heat pump;
   b) a pulse width modulation circuit for obtaining a pulse width modulated signal;
   c) position detecting means for detecting a rotational position of a rotor of the brushless motor by comparing a terminal voltage of each winding with a reference voltage, thereby generating a position detection signal;
   d) energization signal forming means determining a commutation time on the basis of the position detection signal generated by the position detecting means and forming an energization signal corresponding to the determined commutation time, the energization signal forming means having a normal energization signal forming pattern and a loss increasing energization signal forming pattern wherein an efficiency of the brushless motor is lower than in the normal energization signal forming pattern, the energization signal forming means switching from the normal signal forming pattern to the loss increasing energization signal forming pattern in a predetermined period during drive of the brushless motor; and
   e) a drive circuit synthesizing the energization signal and the pulse width modulated signal, thereby obtaining a signal for driving each switching element.

3. An inverter according to claim 2, wherein the reference voltage is set at one half of a DC power supply voltage supplied to the switching circuit and the position detecting means generates the position detection signal when the terminal voltage of each winding and the reference voltage cross.

4. An inverter according to claim 1 or 2, wherein the energization signal formed in accordance with the loss increasing energization signal forming pattern is formed by adding a loss increasing signal for causing the rotor of the brushless motor to produce a counter torque, to the energization signal formed in accordance with the normal energization signal forming pattern.

5. An inverter according to claim 4, wherein the switching elements include a plurality of positive side switching elements connected between a positive side of a DC power supply circuit and the respective winding terminals and a plurality of negative side switching elements connected between a negative side of the DC power supply circuit and the respective winding terminals and wherein when having formed the loss increasing energization signal for driving one of the positive side switching elements, the energization signal forming means does not form the energization signals in accordance with the normal energization signal forming pattern, for driving the other positive side switching elements and when having formed the loss increasing energization signal for driving one of the negative side switching elements, the energization signal forming means does not form the normal energization signals for driving the other negative side switching elements.

6. An inverter according to claim 2 or 3, wherein the energization signal formed in accordance with the loss increasing energization signal forming pattern is formed by adding a loss increasing signal for causing the rotor of the brushless motor to produce a counter torque, to the energization signal formed in accordance with the normal energization signal forming pattern and wherein the energization signal forming means forms said loss increasing energization signal a predetermined period of time after the time when each winding terminal voltage and the reference voltage cross.

7. An inverter according to claim 4, wherein the energization signal forming means changes a period of the loss increasing energization signal, thereby controlling the motor loss.

8. An inverter according to claim 4, further comprising current detecting means for detecting a current supplied to the switching circuit and wherein the energization signal forming means compensates a period of the loss increasing signal on the basis of the current detected by the current detecting means.

9. An inverter according to claim 3, wherein the energization signal forming means comprises a first timer measuring a period between a time when the terminal voltage of each winding and the reference voltage cross and a subsequent time when the terminal voltage of each winding and the reference voltage cross, operation means for operating a period between the time when the terminal voltage of each winding and the reference voltage cross and a commutation time, on the basis of the period measured by the first timer, and a second timer timing the period obtained by the operation means and wherein the commutation time is determined to be a time when the second timer completes the timing operation.

10. An inverter according to claim 9, wherein the energization signal formed in accordance with the loss increasing energization signal forming pattern is formed by adding a loss increasing signal for causing the rotor of the brushless motor to produce a counter torque, to the energization signal formed in accordance with the normal energization signal forming pattern, the energization signal forming means further comprises a third timer starting a timing operation at the time when the terminal voltage of each winding and the reference voltage cross, and the energization signal forming means forms the loss increasing energization signal during the timing operation of the third timer.

11. An air conditioner comprising a heat pump including a compressor driven by a brushless motor, an outdoor heat exchanger, a pressure reducing device and an indoor heat exchanger connected in turn by a refrigerant passage, wherein the brushless motor is controlled by the inverter claimed in claim 1 or 2.

12. An air conditioner according to claim 11, wherein the brushless motor is controlled on the basis of the loss increasing energization signal forming pattern either during a defrosting operation performed for removing frost on the outdoor heat exchanger or during a preparatory defrosting operation performed prior to the defrosting operation.

13. An air conditioner according to claim 11, further comprising a first temperature sensor sensing a temperature of the compressor, a second temperature sensor sensing a temperature of either the indoor or outdoor heat exchanger functioning as a condenser during an operation of the air conditioner, and means for operating the difference between the temperatures sensed by the first and second temperature sensors and wherein the brushless motor is controlled on the basis of the loss increasing energization signal forming pattern when the difference between the temperatures sensed by the first and second temperature sensors takes a predetermined value or below.

* * * * *